March 8, 1960 D. J. JAMIESON 2,927,975

AUTOMATIC REVERSING MECHANISM FOR A TAPE RECORDER

Filed May 10, 1957 2 Sheets-Sheet 1

INVENTOR.
DAVID J. JAMIESON,
BY
McMorrow, Berman & Davidson
ATTORNEYS.

March 8, 1960 D. J. JAMIESON 2,927,975

AUTOMATIC REVERSING MECHANISM FOR A TAPE RECORDER

Filed May 10, 1957 2 Sheets-Sheet 2

INVENTOR.
DAVID J. JAMIESON,
BY
McMorrow, Berman + Davidson
ATTORNEYS.

United States Patent Office 2,927,975

Patented Mar. 8, 1960

2,927,975

AUTOMATIC REVERSING MECHANISM FOR A TAPE RECORDER

David J. Jamieson, McCloud, Calif.

Application May 10, 1957, Serial No. 658,359

5 Claims. (Cl. 179—100.2)

This invention relates to magnetic tape recorders, and more particularly to a reversing attachment for use with a magnetic tape recorder of the type provided with dual motors, dual recording and play-back heads, and a reversing mechanism operated by a rotatable control member which is ordinarily manually operated.

A main object of the invention is to provide a novel and improved automatic reversing attachment for a magnetic tape recorder of the type having dual motors, dual play-back and recording heads, and a manually operated rotatable reversing control member, for example, a tape recorder similar to Webcor model No. 210 manufactured by Webster-Chicago Company, Chicago, Illinois, the automatic reversing attachment involving simple components, being easy to install, and being arranged so that it responds automatically to the proximity of the end of a magnetic tape to energize the reversing attachment and to cause the direction of movement of the tape to be reversed.

A further object of the invention is to provide an improved automatic tape reversing attachment for use with a magnetic tape recorder of the dual-motor, dual-head type, such as the Webcor model No. 210, the attachment being compact in size, being dependable in operation, and eliminating the necessity of supervising the movement of the magnetic tape in order to insure that the direction of tape movement will be reversed at the proper time, whereby an uninterrupted recording may be obtained, or whereby substantially uninterrupted play-back of a previously recorded item may be achieved by the apparatus.

A still further object of the invention is to provide an improved automatic reversing attachment for a magnetic tape recorder of the dual-motor, dual-head type, said attachment involving durable components, operating at relatively low voltage, being arranged so that it produces relatively small distortion of recorded material on the tape with which the apparatus is employed, and having relatively light mechanical contact with the tape so that damage to the tape is prevented.

A still further object of the invention is to provide an improved automatic reversing attachment for use with a magnetic tape recorder similar to the Webcor model No. 210, the attachment being arranged to automatically reverse the direction of movement of the tape when the end thereof is approached, so that recording on the tape is substantially uninterrupted by the reversal of movement of the tape, the attachment being provided with means to automatically maintain the recording push button of the tape recorder in depressed position during the rotation of the reversing control member, and being arranged so that close attention of the operator is not required when the tape approaches the end thereof in order to provide proper reversal of the tape and to maintain continuity of recording or play-back despite reversal of the direction of movement of the tape.

Further objects and advantages of the invention will become apparent from the following description and claims, and from the accompanying drawings, wherein:

Figure 1:
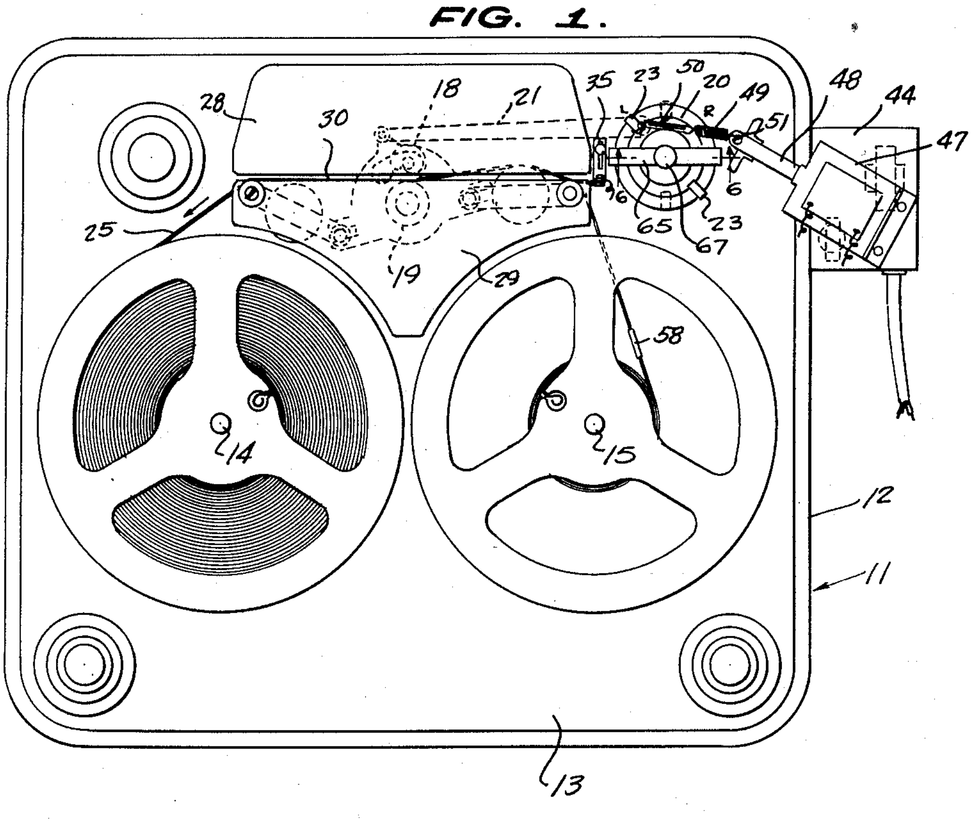
Figure 1 is a top plan view of a tape recorder, similar to the Webcor model No. 210, equipped with an automatic reversing attachment constructed in accordance with the present invention.
Figure 2:
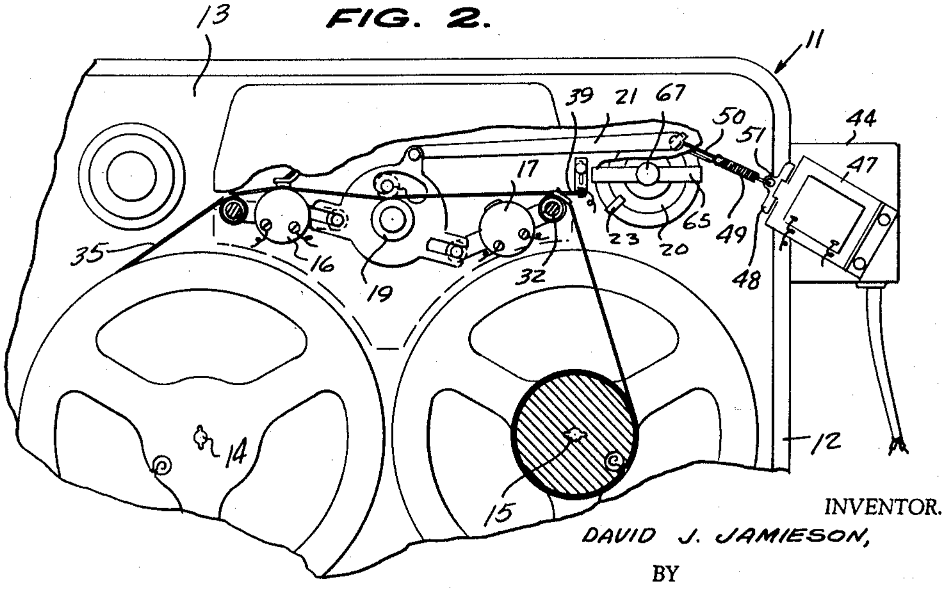
Figure 2 is a fragmentary top plan view with parts broken away, of the magnetic tape recorder and reversing attachment of Figure 1, showing the apparatus in reversed position.

Referring to the drawings, 11 generally designates a conventional tape recorder of the dual-motor, dual-head type, similar to the Webcor model No. 210 made by Webster-Chicago Corporation, Chicago, Illinois. This tape recorder comprises a suitable housing 12 in which is mounted the conventional tape recorder mechanism, including a motor board 13, a pair of reel spindles 14 and 15 on the board and projecting upwardly therefrom, a pair of magnetic recording and play-back heads 16 and 17, a capstan roller 18, a pressure roller 19, said capstan and pressure roller being located between the heads 16 and 17, as shown in Figures 1 and 2, and a rotatable reversing control member 20 mechanically coupled to the reversing mechanism of the recorder, for example, by a link bar 21, so that the direction of movement of a magnetic tape placed in the recorder may be reversed responsive to the rotation of the control member 20. For example, the member 20 comprises a knob 22 formed with diametrically opposed wing elements 23, 23 extending radially and vertically. When the control member 20 is in the position shown in Figure 1, namely, the position wherein the diameter of the wing elements 23, 23 is directed upwardly and to the left, as viewed in Figure 1, the mechanism is set to provide movement of the magnetic tape, shown at 25, to the left as viewed in Figure 1. Under these conditions, the motor coupled to the spindle 14 is energized, the capstan 18 is driven in a counter-clockwise direction, as viewed in Figure 1, and the tape is engaged with the magnetic air gap of the head 17. In order to reverse the tape, namely, to cause the tape to travel to the right, as viewed in Figure 1, the knob 22 is rotated clockwise, namely, to the position thereof shown in Figure 2, wherein the wing members 23, 23 are on a diameter extending upwardly and to the right, as viewed in Figure 2, whereby the motor associated with the spindle 15 is energized, the capstan 18 rotates counter-clockwise, and the magnetic tape engages the air gap of the head 16.

The rotatable control member 20 has a neutral position, wherein the wing elements 23, 23 are vertical, as viewed in Figures 1 and 2, in which position neither spindle is driven and the tape is not gripped between the capstan 18 and the pressure roller 19.

The structure of the tape recorder 11 is conventional and in itself forms no part of the present invention.

Figures 3, 4, 5, 6, 7:
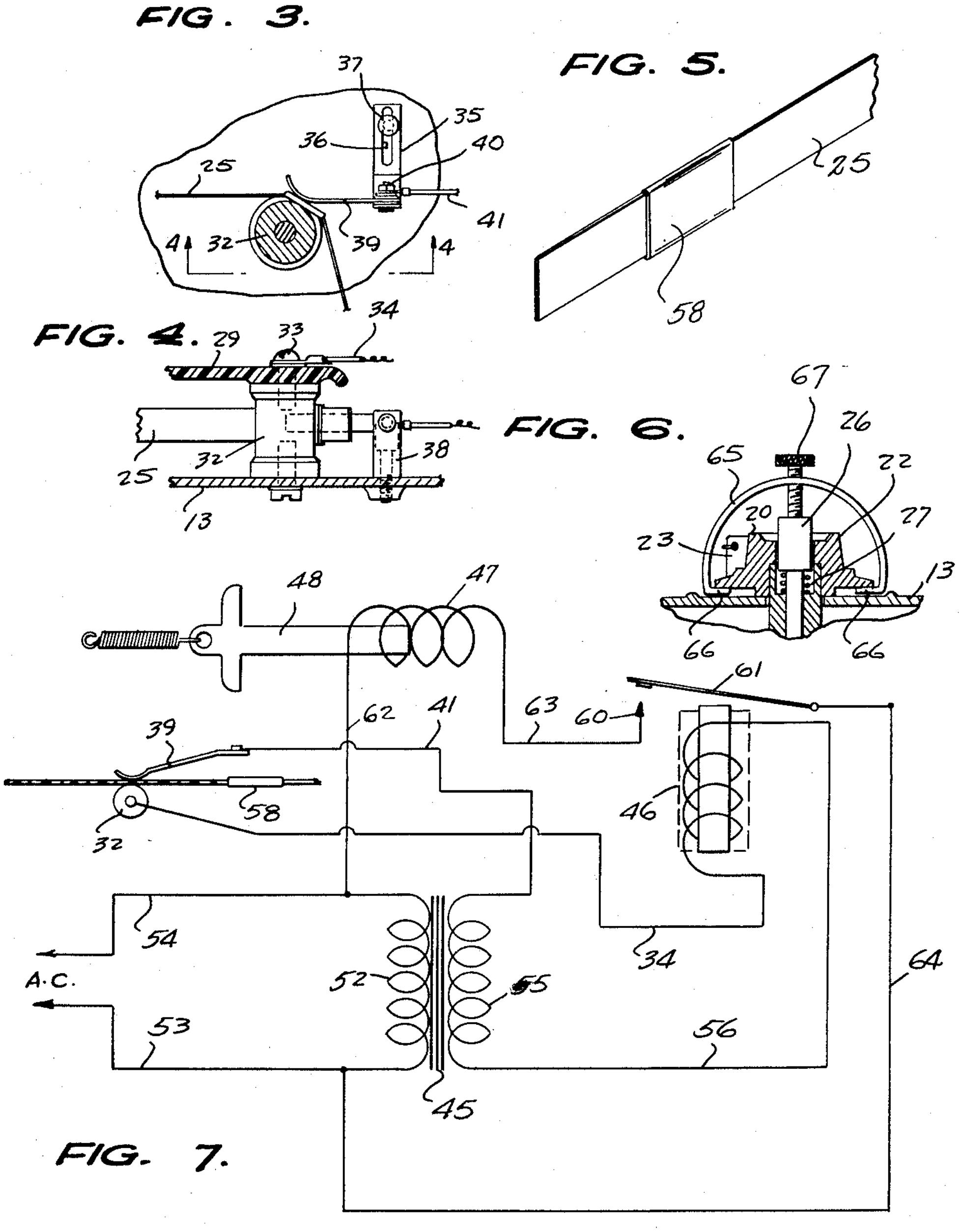
Figure 3 is an enlarged horizontal cross sectional detail view taken through the vertical conductive post element located adjacent the tape guideway of the tape recorder of Figures 1 and 2, and the brush element cooperating therewith, forming the conductor-responsive means to energize the reversing mechanism when the end of the magnetic tape is approached.
Figure 4 is a vertical cross sectional view taken on the line 4—4 of Figure 3.
Figure 5 is an enlarged fragmentary perspective view of an end portion of a magnetic tape adapted to be employed in conjunction with the automatic reversing attachment of Figures 1 to 4 and illustrating the conductive sheath mounted thereon for bridging the contacts employed to energize the reversing mechanism.
Figure 6 is an enlarged vertical cross sectional view taken on the line 6—6 of Figure 1 and showing the means for retaining the recording push button depressed when the reversing control member of the tape recorder is actuated.
Figure 7 is a schematic wiring diagram showing the electrical connections employed in the reversing mechanism of Figure 1.

The tape recorder 11 includes a recording push button 26 which must be depressed in order for the apparatus to record, suitable means being provided to lock the push button 26 in depressed position when the control member 20 is in either of its two operating positions, namely, in the position wherein the tape moves to the left, or in the position wherein the tape moves to the right, the push button 26 being automatically released when the control member 20 is rotated to its neutral position, namely, wherein the wing elements 23, 23 are on a vertical diameter, as viewed in Figure 1. As shown in Figure 6, the push button 26 is biased upwardly by a coiled spring 27, which ordinarily allows the push button to be elevated when the control member 20 is in its neutral position.

As will be seen from Figure 1, a pair of housing elements 28 and 29 are provided on the motor board 13, said housing elements overlying the linkage members associated with the recording and play-back heads 16 and 17, and the capstan 18 and pressure roller 19, the housing members 28 and 29 being spaced to define a tape guideway 30 into which the tape is placed when it is threaded on the recorder, one end of the tape being secured to an empty reel engaged on the driving spindle 14 or 15.

Designated at 32 is a vertical conductive post member which is secured to the motor board 13 beneath the end portion of housing element 29 at one end of the guideway 30 and being arranged so that the tape 25 passes thereover. As shown, a terminal screw 33 extends through the housing element 29 and is threadedly engaged into the top of the post member 32, a wire 34 being connected thereto, so that said wire 34 is electrically connected to the post member 32. Designated at 35 is an angle bracket secured to the motor board 13 adjacent to the post member 32 and to the end portion of the opposite housing element 28, as shown in Figure 1, said bracket having its horizontal arm formed with a longitudinal slot 36 through which extends a clamping screw 37 threadedly engaged in the motor board 13, whereby the angle bracket 35 may be at times loosened and rotated to a non-obstructing position with respect to the post member 32 to facilitate threading the tape 25 through the guideway 30. The angle bracket 35 is provided with the vertical upstanding arm 38 to which is secured a leaf spring contact member 39, suitable insulation being provided between arm 38 and leaf spring 39 so that the leaf spring is insulated with respect to motor board 13, and is thus insulated relative to the post member 32 when a tape 25 is disposed between the leaf spring and said post member, during ordinary movement of the tape.

As shown in Figure 3, the leaf spring 39 extends inwardly adjacent to the post member 32 and the tape 25 is received therebetween, the end of the leaf spring making light sliding contact with the tape. A terminal screw 40, suitably insulated from the bracket arm 38, is conductively connected to the leaf spring 39 in any suitable manner, and a terminal wire 41 is conductively connected to terminal screw 40.

As above explained, the clamping screw 37 may be manually loosened, to allow the bracket 35 to be rotated to a non-obstructing position, whenever required, so that the tape 25 may be freely threaded into the guideway 30, after which the bracket 35 may be returned to its normal position, shown in Figure 3, and may be secured in said position by tightening the clamping screw 37.

Suitably secured to the side of the tape recorder housing 12 adjacent the control member 20 is a sub-housing 44 containing a step-down transformer 45 and a control relay 46. Secured on the top wall of the sub-housing 44 is a solenoid 47 provided with a slidable plunger 48, said solenoid being mounted on the sub-housing 44 so that the axis of the plunger 48 is directed inwardly and rearwardly toward the upper wing element 23 of the rotatable reversing control member 20, as shown in Figure 1. The end of the solenoid plunger 48 is resiliently connected to the upper wing element 23, as by a coiled spring 49 and a connecting link 50, so that the member 20 may be rotated from the position thereof shown in Figure 1 to the reversed position thereof shown in Figure 2 responsive to the retraction of the plunger 48 into the solenoid 47, namely, responsive to the energization of said solenoid 47.

As shown in Figure 2, the link member 50 may comprise a suitable loop of wire or other material of requisite strength engaged through an aperture in the upper wing element 23 and through the end loop of the coiled spring 49, the opposite end loop of said coiled spring being engaged through an aperture 51 in the solenoid plunger 48.

As shown in Figure 7, the primary winding 52 of transformer 45 is connected to a pair of supply wires 53 and 54. Transformer 45 is of the step-down type, so that the secondary 55 provides relatively low voltage at its terminals, suitable for energizing the relay 46, which is of the low voltage type. As shown, one terminal of the transformer secondary 55 is connected by a wire 56 to one terminal of the winding of the relay 46. The opposite terminal of the relay winding is connected to the wire 34, and hence to the conductive post member 32. The remaining terminal of the secondary 55 of the step-down transformer 45 is connected to the wire 41, and hence to the leaf spring 39. Thus, secondary 55 energizes relay winding 46 responsive to the bridging of the conductive contact elements 32 and 39.

In order to provide energization of the relay 46 when reversing of the tape is required, a conductive sheath 58 of metal foil, or other suitable material is mounted on the end portion of the tape 25, so that when the tape approaches its end, the conductive sheath 58 passes between post member 32 and leaf spring 39, bridging the elements 32 and 39 and causing the winding of relay 46 to be energized from the secondary 55 of transformer 45 by a circuit comprising secondary 55, wire 56, the winding of relay 46, wire 34, post member 32, the conductive sheath 58, leaf spring 39, and wire 41.

Relay 46 is provided with a stationary contact 60 and the movable armature 61, which is engageable with contact 60 responsive to the energization of the winding of the relay. One terminal of solenoid 47 is connected by a wire 62 to the line wire 54. The opposite terminal of the solenoid winding is connected by a wire 63 to the stationary contact 60 of relay 46. Armature 61 of relay 46 is connected by a wire 64 to line wire 53.

As will be readily apparent, when relay 46 becomes energized, armature 61 engages contact 60, causing the solenoid 47 to be energized by a circuit comprising line wire 54, wire 62, the winding of the solenoid, wire 63, contact 60, armature 61, wire 64, and line wire 53. Energization of solenoid 47 causes its armature 48 to be retracted, whereby the reversing control member 20 is rotated from the position thereof shown in Figure 1 to the position thereof shown in Figure 2, causing the tape recorder to be reversed.

As above explained, ordinarily, the push button 26, which is depressed during recording, will be released during reversing of the tape recorder. In order to insure that the push button 26 is retained in a depressed position at all times during recording, and especially during the reversing of the recorder by the mechanism above described, a yoke member 65 is provided, said yoke member being shaped to overlie the control member 20 and being provided with inturned horizontal bottom lugs 66, 66 which are engaged beneath diametrically opposite portions of the flange of the knob element 22 of control member 20, as is clearly shown in Figure 6. A vertical retaining screw 67 is threaded through the top of the yoke member 65 and may be tightened sufficiently to hold the push button 26 in a depressed position after recording is initiated. Therefore, when the machine automatically reverses, responsive to the engagement of the conductive sheath element 58 between post member 32 and leaf spring 39, as above described, the reversal of the control member 20 does not cause the push button 26 to be elevated as the control member passes through its neutral position, due to the retaining effect of the vertical screw 67.

The yoke member 65 may be removed during play-back, or the screw 67 may be merely loosened sufficiently so as not to engage the recording push button 26 at this time, since the push button 26 is not employed during play-back of the recorder.

As will be readily understood, the reel carrying the tape is first mounted on the spindle 15, the empty reel being placed on the spindle 14. The end of the tape is secured to the empty reel in the usual manner, the tape being threaded through the guideway 30. At this time the control member 20 is in its neutral position, with the wing members 23, 23 on a vertical diameter, as viewed in Figure 1. To begin operation the control member 20 is rotated counterclockwise, so that the wing members 23, 23 are on a diameter directed upwardly and to the left, as viewed in Figure 1. This causes the spindle 14 to rotate the empty reel and causes the tape to wind up thereon, the tape moving to the left. When the end of the tape is approached, the sheath member 58 engages between the conductive post member 32 and the leaf spring 39, bridging these elements and energizing relay 46, as above described, whereby solenoid 47 becomes energized and retracts its plunger 48. This causes the rotary control member 22 to be rotated from the position thereof shown in Figure 1 to the opposite position thereof, namely, the position thereof shown in Figure 2, causing the direction of movement of the tape to be reversed.

While a specific embodiment of an improved automatic reversing device for a magnetic tape recorder has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a magnetic tape recorder of the type having a substantially horizontal motor board, a pair of reel spindles on said board, a pair of magnetic recording and play-back heads, pressure roller means between said heads, respective motor means, and a rotatable reversing control member formed and arranged to selectively energize said motor means, couple the motor means to the reel spindles, energize the roller means in one direction or the other, and selectively move said heads into tape-engaging positions, said control member having a radially extending vertical wing element, means defining a tape guideway, a pair of contacts adapted to be engaged by a magnetic tape traveling through said guideway, a horizontal solenoid mounted adjacent said motor board, a horizontal plunger controlled by said solenoid and retracted responsive to energization thereof, a coiled spring connecting said plunger to said wing element, and means energizing said solenoid responsive to the bridging of said contacts by a conductive element, whereby to reverse the position of said control member.

2. In combination with a magnetic tape recorder of the type having a motor board, a pair of reel spindles on said board, a pair of magnetic recording and play-back heads, pressure roller means between said heads, respective motor means, and a rotatable reversing control member formed and arranged to selectively energize the motor means, couple the motor means to the reel spindles, energize the roller means in one direction or the other, and selectively move said heads into tape-engaging positions, said control member having a radially extending vertical wing element, means defining a tape guideway, a pair of contacts adapted to be engaged by a magnetic tape traveling through said guideway, a solenoid, means supporting said solenoid laterally adjacent said rotatable reversing control member, a plunger controlled by said solenoid and retracted responsive to energization thereof, spring means resiliently connecting said plunger to said wing element and being formed and arranged to rotate said control member responsive to retraction of said plunger, and means energizing said solenoid responsive to the bridging of said contacts by a conductive element, whereby to reverse the position of said control member.

3. In combination with a magnetic tape recorder of the type having a motor board, a pair of reel spindles on said board, a pair of magnetic recording and play-back heads, a pressure roller means between said heads, respective motor means, a rotatable reversing control member formed and arranged to selectively energize the motor means, couple the motor means to the reel spindles, energize the roller means in one direction or the other, and selectively move said heads into tape-engaging positions, said control member having a radially extending vertical wing element, a depressible recording control push button, and means to normally retain said push button in depressed position except when the rotatable reversing control member is rotated, means defining a tape guideway, a pair of contacts adapted to be engaged by a magnetic tape traveling through said guideway, a solenoid, means supporting said solenoid laterally adjacent said rotatable reversing control member, a plunger controlled by said solenoid and retracted responsive to energization thereof, spring means resiliently connecting said plunger to said wing element and being formed and arranged to rotate said control member responsive to retraction of said plunger, means secured to the rotatable control member and engaging said push button to maintain said push button in depressed position, and means energizing said solenoid responsive to the bridging of said contacts by a conductive element, whereby to reverse the position of said control member.

4. In combination with a magnetic tape recorder of the type having a motor board, a pair of reel spindles on said board, a pair of magnetic recording and play-back heads, pressure roller means between said heads, respective motor means, and a rotatable reversing control member formed and arranged to selectively energize the motor means, couple the motor means to the reel spindles, energize the roller means in one direction or the other, and selectively move said heads into tape-engaging positions, said control member having a radially extending vertical wing element, means defining a tape guideway, a vertical conductive post element adjacent said guideway, a conductive leaf spring mounted adjacent said guideway and extending over said post element ,said post element and leaf spring being arranged to receive a magnetic tape therebetween while said tape is traveling through the guideway and to be bridged by a conductor carried by the tape, a solenoid, means supporting said solenoid laterally adjacent said rotatable reversing control member, a plunger controlled by said solenoid and retracted responsive to energization thereof, means operatively connecting said plunger to said wing element, and means energizing said solenoid responsive to the bridging of said post element and leaf spring by such a conductor, whereby to reverse the position of said control member.

5. In combination with a magnetic tape recorder of the type having a motor board, a pair of reel spindles on said board, a pair of magnetic recording and play-back heads, pressure roller means between said heads, respective motor means, a rotatable reversing control member formed and arranged to selectively energize the motor means, couple the motor means to the reel spindles, energize the roller means in one direction or the other, and selectively move said heads into tape-engaging positions, said control member having a radially extending vertical wing element, a depressible recording control push button, and means to normally retain said push button in depressed position except when the rotatable reversing control member is rotated, means defining a tape guideway, a vertical conductive post element adjacent said guideway, a conductive leaf spring mounted adjacent said guideway and extending over said post element, said post element and leaf spring being arranged to receive a magnetic tape therebetween while said tape is traveling through the guideway and to be bridged by a conductor carried by the tape, a solenoid, means supporting said solenoid laterally adjacent said rotatable reversing control member, a plunger controlled by said solenoid and retracted responsive to energization thereof, spring means resiliently connecting said plunger to said wing element and being formed and arranged to rotate said control member responsive to retraction of said plunger, means secured to the rotatable control member and engaging said push button to maintain said push button in depressed position, and means energizing said solenoid responsive to the bridging of said post element and leaf spring by such a conductor, whereby to reverse the position of said control member.

References Cited in the file of this patent

UNITED STATES PATENTS

| | | |
|---|---|---|
| 2,032,190 | Thomas | Feb. 25, 1936 |
| 2,668,059 | Roberts | Feb. 22, 1954 |
| 2,694,110 | Roberts | Nov. 9, 1954 |